(12) United States Patent
Iyer et al.

(10) Patent No.: US 11,271,488 B2
(45) Date of Patent: Mar. 8, 2022

(54) SYSTEM AND METHOD FOR FACTS DEVICE BYPASS MODE OPERATION AND DIAGNOSTICS

(71) Applicant: Smart Wires Inc., Union City, CA (US)

(72) Inventors: Amrit Iyer, Oakland, CA (US); Antonio Ginart, Santa Clarita, CA (US); Shreesha Adiga Manoor, Milpitas, CA (US); Haroon Inam, San Jose, CA (US)

(73) Assignee: Smart Wires Inc., Union City, CA (US)

( * ) Notice: Subject to any disclaimer, the term of this patent is extended or adjusted under 35 U.S.C. 154(b) by 31 days.

(21) Appl. No.: 16/890,650

(22) Filed: Jun. 2, 2020

(65) Prior Publication Data

US 2021/0028713 A1 Jan. 28, 2021

Related U.S. Application Data

(60) Provisional application No. 62/878,603, filed on Jul. 25, 2019.

(51) Int. Cl.
 *H02J 3/18* (2006.01)
 *H02M 5/12* (2006.01)
 (Continued)

(52) U.S. Cl.
 CPC ............. *H02M 5/12* (2013.01); *H02J 3/0012* (2020.01); *H02J 3/1814* (2013.01); *H02M 1/32* (2013.01); *H02M 1/322* (2021.05)

(58) Field of Classification Search
 CPC .......... H02J 3/1814; H02J 3/12; H02J 3/0012; H02M 1/322; H02M 5/08; H02M 5/12; H02M 1/32
 See application file for complete search history.

(56) References Cited

U.S. PATENT DOCUMENTS

| | | | |
|---|---|---|---|
| 8,638,576 B2 | 1/2014 | Hosini et al. | |
| 8,760,120 B2 | 6/2014 | Hasler | |

(Continued)

FOREIGN PATENT DOCUMENTS

| | | | |
|---|---|---|---|
| CN | 103368441 A | * | 10/2013 |
| EP | 2700152 A2 | | 2/2014 |

(Continued)

OTHER PUBLICATIONS

Bing Pan, A Hierarchical Control Strategy for Cascaded H-bridge Multilevel Static Synchronous Series Compensator, Nov. 16, 2016, IEEE, IEEE 19th International Conference on Electrical Machines and Systems, 5 pages. (Year: 2016).*

(Continued)

*Primary Examiner* — Harry R Behm
(74) *Attorney, Agent, or Firm* — Womble Bond Dickinson (US) LLP

(57) ABSTRACT

A system and method using four switches connected in an H-bridge (full bridge) topology within a series-connected FACTS device is disclosed. System and method can be used to bypass a FACTS device. The switches in H-bridge are connected to an alternating current (AC) source allowing for various switching states, and enabling non-monitoring mode, local bypass monitoring mode, low-loss monitoring mode, and diagnostic mode of operation.

19 Claims, 5 Drawing Sheets

(51) Int. Cl.
*H02J 3/00* (2006.01)
*H02M 1/32* (2007.01)

(56) References Cited

U.S. PATENT DOCUMENTS

| | | |
|---|---|---|
| 8,848,407 B2 | 9/2014 | Blomberg |
| 8,860,380 B2 | 10/2014 | Hasler |
| 9,459,294 B2 | 10/2016 | Cheng |
| 9,590,483 B1 | 3/2017 | Basic |
| 2005/0073200 A1* | 4/2005 | Divan ...................... H01F 30/16 307/44 |
| 2014/0112038 A1 | 4/2014 | Hasler et al. |
| 2017/0192060 A1* | 7/2017 | Pizzuti ................. G01R 31/327 |
| 2017/0294853 A1* | 10/2017 | Flannery ............... H02J 3/1857 |

FOREIGN PATENT DOCUMENTS

| | | |
|---|---|---|
| EP | 2700152 B1 | 3/2016 |
| JP | 2016077135 A * | 5/2016 |
| WO | WO-2011113492 A1 * | 9/2011 ............. H02M 1/32 |
| WO | 2012143037 A2 | 10/2012 |

OTHER PUBLICATIONS

Extended European Search Reported dated Oct. 26, 2020; European Patent Application No. 20186914.6 (9 pages total).

* cited by examiner

SYSTEM AND METHOD FOR FACTS DEVICE BYPASS MODE OPERATION AND DIAGNOSTICS

This application claims benefit of priority from U.S. Provisional Application No. 62/878,603 filed Jul. 25, 2019, which is hereby incorporated by reference.

TECHNICAL FIELD

The present disclosure relates to systems and methods for Flexible AC Transmission Systems (FACTS) and specifically relates to fault current protection of series connected FACTS devices.

BACKGROUND

FACTS (Flexible AC Transmission Systems) devices are complex semiconductor-based devices that operate in either in series or shunt mode and provide more granular and faster control than electro-mechanical devices. FACTS devices have become critical for improving power system efficiencies.

Referring to FIG. 1A, which represents a system 100 showing FACTS device as a part of the power grid systems. System 100 includes a generator 101 and transformer 110-01 to step up voltage before transmission on transmission line 105. CB (Circuit Breaker)/AR (Auto-recloser) 120-01 is used to isolate and protect transmission line 105 from transformer 110-01 and generator 101. Included in the power grid system are series-connected FACTS device 130-01, 130-02, 130-3 . . . , 130-0n. A second CB/AR 120-02 is used to isolate rest of the power grid (represented by transformer 110-02, 102 etc.). Examples of series-connected FACTS device include Static Synchronous Series Compensator (SSSC), Thyristor controlled Series Compensators (TCSC), etc. Series-connected FACTS device 130 can be used to control the reactance of the transmission line to improve the efficiency of transmission. Typically, multiple series-FACTS devices are connected in series to provide a more effective control of the transmission line 105. The multiple FACTS devices are shown as 130-01, 130-02 . . . 130-0n in FIG. 1A. Bypass-breaker 140 is used to protect the device in case of fault or in case FACTS devices need to be bypassed. As shown in FIG. 1A, a single bypass-breaker 140 is used protect multiple series-connected FACTS devices. Referring to FIG. 1B, which is similar to system 100 shown in FIG. 1B with exception being that each series-connected devices 130-01, 130-02 . . . 130-0n are now protected individual bypass-breaker 140-01, 140-02 . . . 140-0n respectively.

Referring to FIG. 2, which shows a prior-art example of a series-connected capacitive compensation device. FIG. 2 shows more detailed representation of protection typically used in bypass-breaker 140 illustrated in FIG. 1A and FIG. 1B and includes MOV (Metal-Oxide Varistor) bank 203 and a triggered gap 205. The triggered gap 205 (e.g. vacuum bottle) is in series with an inductance 204 (used to limit current). CB 206 is used bypass for longer periods.

System 100 as shown in FIG. 1A with a single protection bypass-breaker 140 for multiple device has the drawback that if one FACTS device needs to bypassed rest of the FACTS devices are also bypassed. System 100 as shown in FIG. 1B has the drawback that it adds weight, complexity and cost to the system. There is a need for a better protection scheme that reduces complexity, weight, and cost of the FACTS device(s)-based system(s) while providing a better controllability of the bypass of FACTS devices.

SUMMARY

A Flexible AC Transmission Systems (FACTS) device and related method of operation are disclosed herein.

One embodiment is a FACTS device having protection. The device includes a capacitor, a current transformer, four switches in an H-bridge and a state machine. The top and bottom of the H-bridge are connected across the capacitor. The middle of the H-bridge is connectable across a series connection of the current transformer and an alternating current (AC) current source. The state machine operates the four switches in the H-bridge in multiple modes. A non-monitoring mode charges and discharges the capacitor, to inject a voltage into a high-voltage (HV) power transmission line, to modify power grid characteristics. A local bypass monitoring mode bypasses the capacitor. Upper switches of the H-bridge are enabled and lower switches of the H-bridge are disabled, or the lower switches of the H-bridge are enabled and the upper switches of the H-bridge are disabled. A low-loss monitoring mode discharges the capacitor, with all four switches of the H-bridge enabled.

One embodiment is a system to protect a FACTS device in a high-voltage power transmission line. The system includes a capacitor, four switches, a current transformer and a state machine. The first terminal of the first switch and the first terminal of the second switch are connected to the first terminal of the capacitor. The first terminal of the third switch and the first terminal of the fourth switch are connected to the second terminal of the capacitor. The second terminal of the first switch and the second terminal of the second switch are connectable to the first terminal of an AC current source The first terminal of the current transformer is connectable to the second terminal of the AC current source. The second terminal of the current transformer is connected to the second terminal of the third switch and the second terminal of the fourth switch. The state machine operates the four switches in multiple modes. A non-monitoring mode charges and discharges the capacitor to inject a voltage into the HV power transmission line to modify power grid characteristics. A local bypass monitoring mode bypasses the capacitor. The first and third switches are enabled and the second and fourth switches are disabled, or the second and fourth switches are enabled and the first and third switches are disabled. A low-loss monitoring mode discharges the capacitor. The first, second, third and fourth switches are enabled. A diagnostic mode monitors current across each of the four switches. Deviation of current across the switch indicates a potential issue.

One embodiment is a method of protecting a FACTS device. The method is performed by the FACTS device. The FACTS device operates four switches of an H-bridge. In a non-monitoring mode, the FACTS device operates the switches to charge a capacitor from an AC current source and discharge the capacitor to inject a voltage into a high-voltage power transmission line to modify power grid characteristics. Responsive to a determination to discharge the capacitor, the FACTS device operates the switches in a low-loss monitoring mode. All four switches of the H-bridge are enabled.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The drawings are made to point out and distinguish embodiments of the invention from the prior art. The objects, features and advantages of the embodiments of the invention are detailed in the description taken together with the drawings.

DETAILED DESCRIPTION

A system and method using switches connected in an H-bridge topology within a series-connected FACTS device is disclosed. System and method can be used to bypass a FACTS device. The switches in H-bridge are connected to a current source allowing for various switching states enabling bypass and diagnostic modes of operation.

Figure 1A:
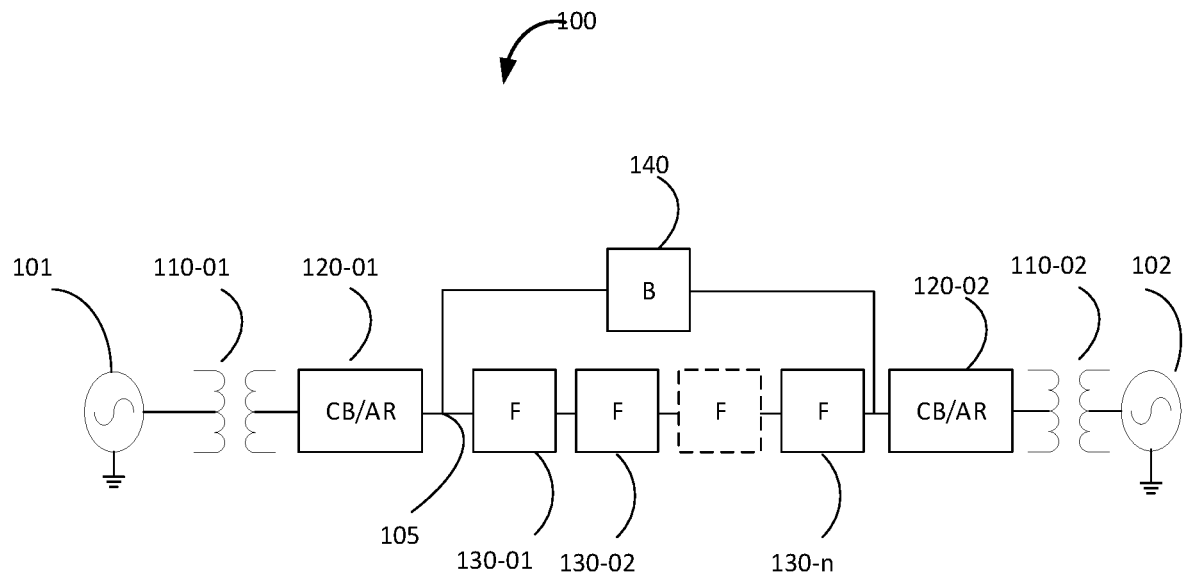
FIGS. 1A and 1B are prior art system block diagram 100 of FACTS devices as part of the power grid system illustrating bypass protection schemes.
Figure 1B:
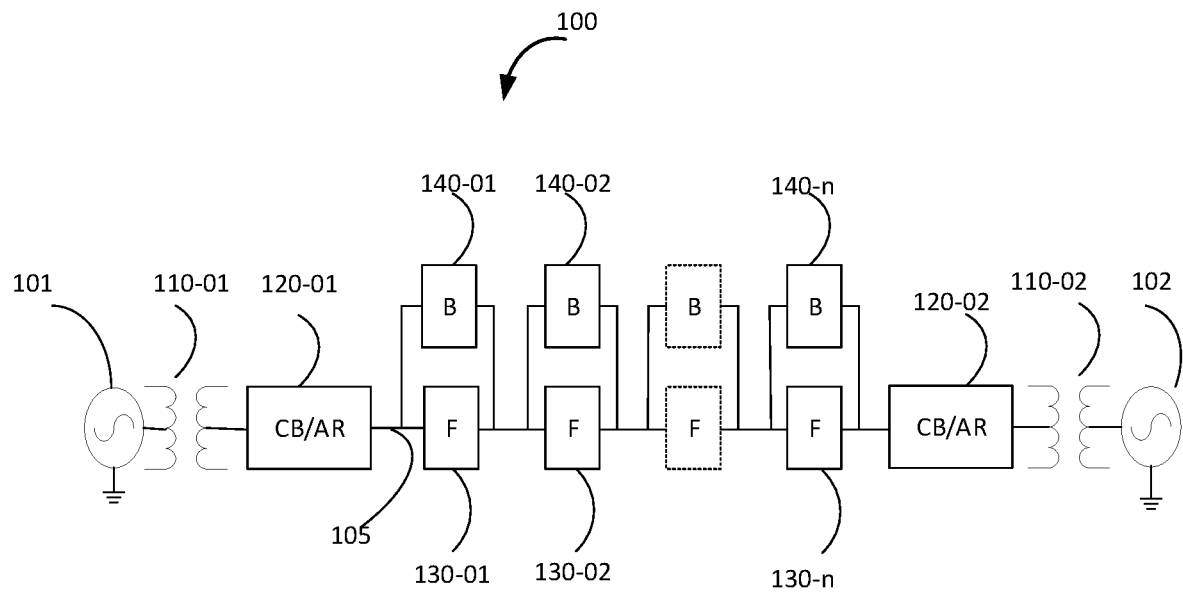
Figure 2:
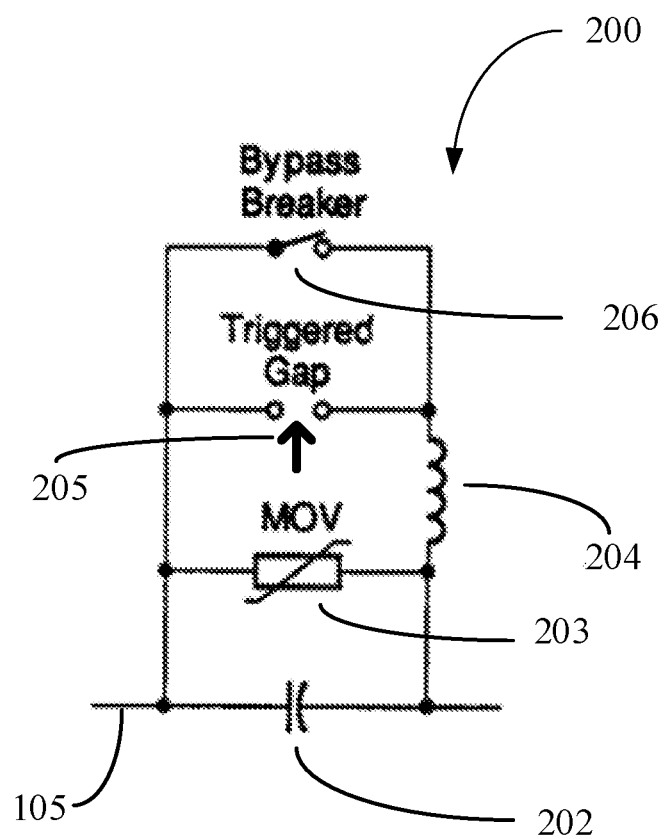
FIG. 2 is a prior art block diagram 200 of a series capacitor bank including the fault current protection components.
Figure 3:
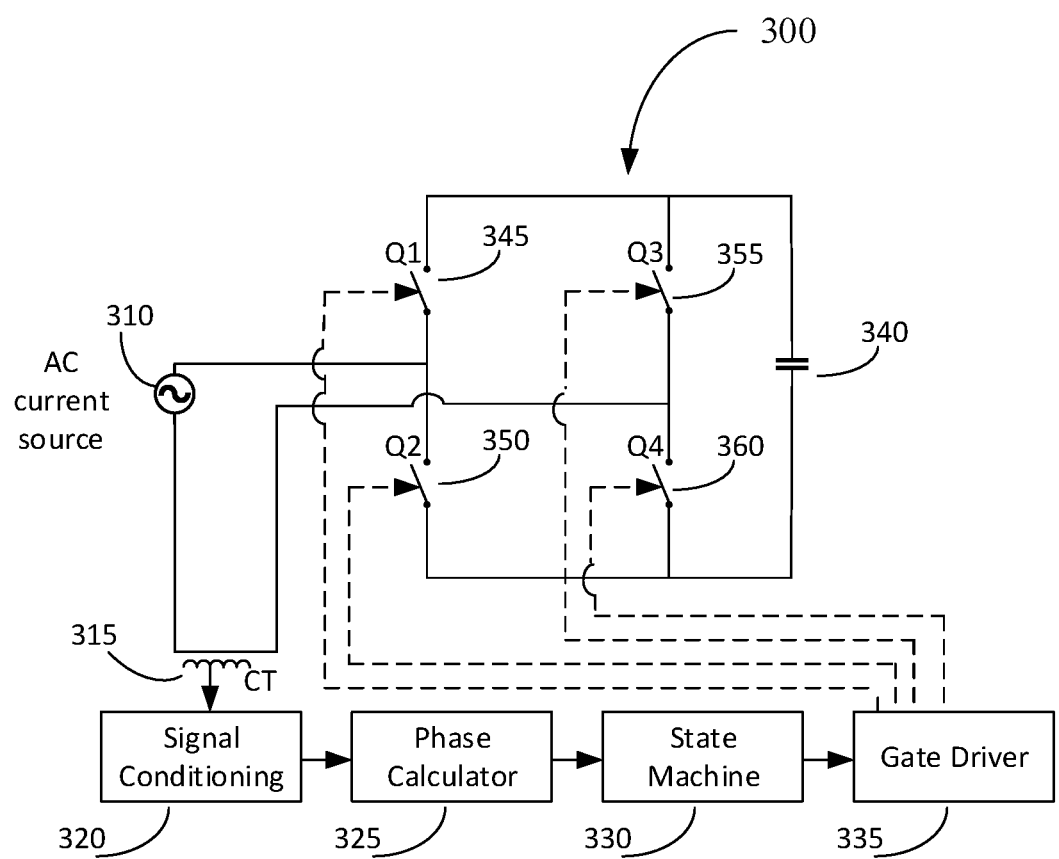
FIG. 3 is an example block diagram of the system 300 showing switches connected in an H-bridge topology within a series-connected FACTS device according to one embodiment.

FIG. 3 shows system 300 with switches connected in a H-bridge topology within a series-connected FACTS device according to one embodiment. As shown in FIG. 3, system 300 is connected to an AC current source 310. Switches Q1 345, Q2 350, Q3 355, and Q4 360 connected in a H-bridge topology function as a series-connected device 130 shown in system 100.

Figure 4:
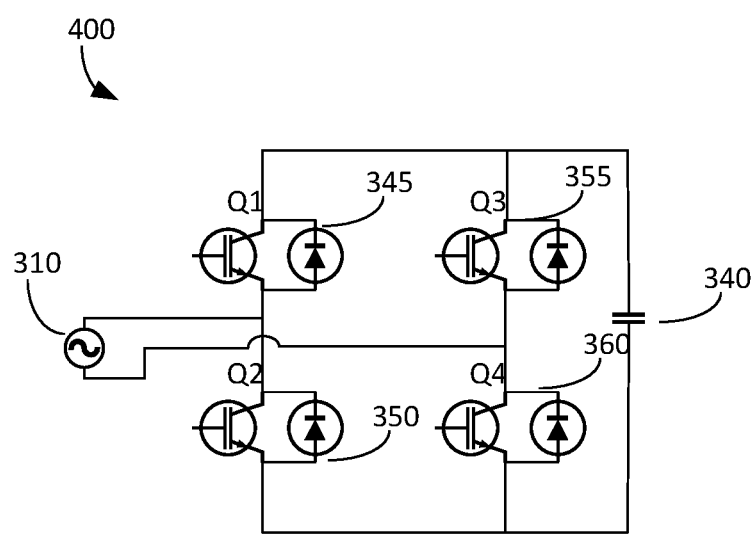
FIG. 4 is an example block diagrams of the IGBT switches connected in H-bridge used in system 300 according to one embodiment.

FIG. 4 shows the example block diagrams of the IGBT switches connected in H-bridge used in system 300 according to one embodiment. Switches Q1 345, Q2 350, Q3 355, Q360 are implemented using IGBTs as shown in the FIG. 4. The practitioners of the art will be able to understand and modify and use other type of switches.

Referring back to FIG. 3, the H-bridge is connected to capacitor 340, which can be charged and discharged by controlling the various switches of the H-bridge and allows injection of voltage into the power grid to modify power grid characteristics. In an example operation, Q1 345 and Q4 360 are ON and Q2 350 and Q3 355 are OFF, and then the capacitor 340 can be charged. In descriptions of switch operation, the terms on, enabled, conducting and closed are considered equivalent. The terms off, disabled, non-conducting and open are considered equivalent.

When the system 300 needs to be bypassed, either the upper-half (Q1 345 and Q3 355) or lower-half (Q2 350 and Q4 350) of the H-bridge is enabled, allowing the FACTS device to be bypassed. This is referred as the local bypass mode in this document. When a fault exists, the operation of the H-bridge can alternate between the top- or bottom-half of the H-bridge. Allowing the H-bridge to be connected to a current source allows it to circulate current without affecting the capacitor voltage. When the capacitor needs to be rapidly discharged, all four switches Q1 345, Q2 350, Q3 355 and Q4 350 are turned on providing a safe current path.

In another embodiment, current of the switches are monitored. If identical switches are used (which is typical) the currents across the four switches should be identical. If the current in one of the switches is different, this could indicate a potential issue with that switch. In this mode of operation, diagnostics of the switches and connections can be performed.

Signal Conditioning 320 uses CT (current transformer) 315 to extract current from the system 300. Signal Conditioning 320 filters out any unwanted noise from the extracted current and the output is fed into the Phase Calculator 325. The Phase Calculator 325 uses the current to calculate the phase of the voltage to be injected into the system 300. Phase Calculator 325 typically uses PLL (Phase Locked Loops) and similar circuits. State Machine 330 generates the appropriate control signal and drives the Gate Driver 335. Gate Driver 335 provides the correct voltage, isolation, waveforms etc. to drive the gate of the switches Q1 345, Q2 350, Q3 355, and Q4 360.

Embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc. Processes, or methods, described herein can be practiced by embodiments of the FACTS device through implementations in hardware, software executing on one or more processors, firmware, or combinations thereof in various embodiments. In one embodiment, the processes or methods are practiced by a controller that includes the state machine 330.

Figure 5:
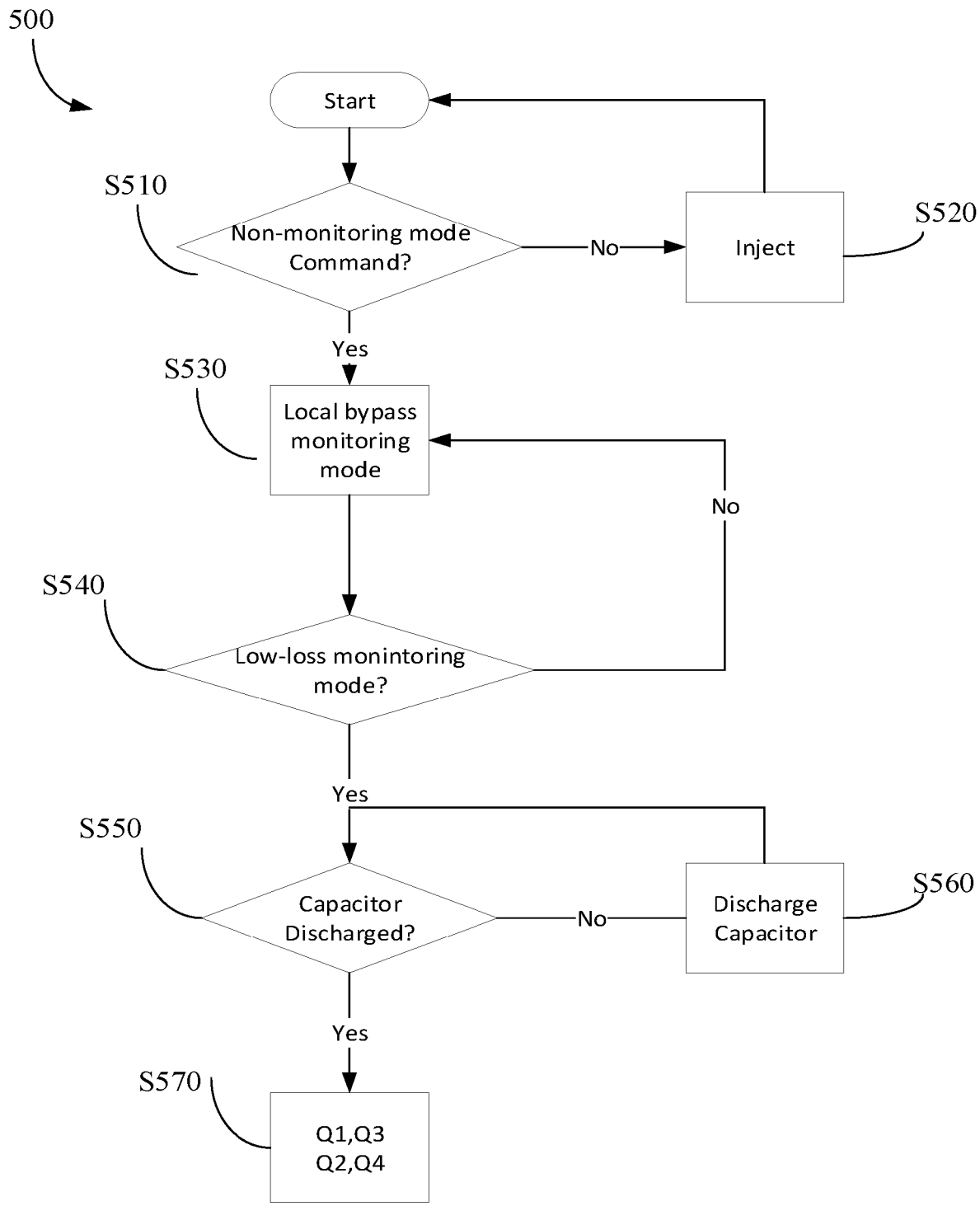
FIG. 5 is an example flow chart and shows a method for using switches connected in an H-bridge topology to protect series-connected FACTS device according to one embodiment.

FIG. 5 is an example flow chart and shows a method for using switches connected in an H-bridge topology to protect series-connected FACTS device according to one embodiment. The method 500 starts at block S510, where the method checks mode command to see if the mode command is a non-monitoring mode (i.e. normal operation) and moves to block S520 or block S530. In block S520, method 500 injects voltage into the system 300 to improve efficiency of the system 300. In block S530, the H-bridge operates in the local bypass monitoring mode, where either the top-half or bottom-half is enabled. The H-bridge operates in a bypass mode instead of a half-bridge mode. In this document, the operation of Q1 345 and Q4 360 (or Q3 355 and Q2 350) is referred to as half-bridge mode. At block 540, the method 500 checks to see if there is a command for a low-loss monitoring mode. At block 550, the method checks to see if capacitor 340 has been discharged. At block S560, the capacitor is discharged. At block S570, all the switches Q1 345, Q2 350, Q3 355, and Q4 360 are turned on.

With reference to FIGS. 1-5, embodiments of a FACTS device may have some or all of the following features.

An embodiment may form a system and practice a method to protect series-connected FACTS devices using H-bridge topology enabling:

Bypass method where only one-half of the H-bridge is turned on,

Low-loss bypass mode where all switches in H-bridge are turned on, and

Diagnostic mode where the current across the switches are monitored.

An embodiment may practice a method to protect series-connected FACTS devices in a high voltage (HV) power transmission line, including:

Switches are connected in H-bridge topology and have the following modes of operation.

In the normal mode of operation or non-monitoring mode of operation, the H-bridge switch injects voltage into the HV power transmission line (to modify power grid characteristics.

In response to a fault on the HV line, local bypass monitoring mode is turned on, where either the upper-half (Q1 345 and Q3 355) or lower-half (Q2 350 and Q4 350) of the H-bridge is enabled, allowing the device to be bypassed.

Low-loss monitoring mode, where capacitors are discharged, and all four switches Q1 345, Q2 350, Q3 355 and Q4 350 are turned on providing a safe current path.

Diagnostic mode where the currents across the switches are monitored, and deviation of current across any one switch indicates a potential issue.

Switches are connected into a current source allowing the FACTS device to circulate current without affecting the capacitor attached.

One embodiment is a system to protect series-connected FACTS devices in a high-voltage power transmission line, including:

Switches connected in H-bridge topology to AC current sources,

Where the switches are connected to a capacitor and the manipulation of the various switches allows for the capacitor to be charged/discharged—allowing for voltage to be injected into the system.

Signal Conditioning which uses a CT (current transformer) to extract current from the system, where the Signal Conditioning filters out any unwanted noise.

The output of the Signal Conditioning block is fed into a Phase Calculator which calculates the phase of voltage to be injected into the power transmission line.

The output phase calculator drives the State Machine which generates the appropriate control signal and drives the Gate Driver.

The Gate Driver provides the correct voltage, isolation, waveforms etc. to drive the gate of the switches.

Even though embodiments of the invention disclosed are described using specific implementation, it is intended only to be by way of example and non-limiting. The practitioners of the art will be able to understand and modify the same based on new innovations and concepts, as they are made available. The embodiments of the invention are intended to encompass these modifications.

Thus, the present disclosure has a number of aspects, which aspects may be practiced alone or in various combinations or sub-combinations, as desired. Also, while certain embodiments of the invention have been disclosed and described herein for purposes of illustration and not for purposes of limitation, it will be understood by those skilled in the art that various changes in form and detail may be made therein without departing from the spirit and scope of the invention.

What is claimed is:

1. A Flexible AC Transmission Systems (FACTS) device having protection, comprising:
  a capacitor;
  a current transformer;
  four switches in an H-bridge, with top and bottom of the H-bridge connected across the capacitor and middle of the H-bridge connectable across a series connection of the current transformer and an alternating current (AC) current source; and
  a state machine to operate the four switches in the H-bridge, when the H bridge is so connected across the series connection of the current transformer and the AC current source, in a plurality of modes comprising:
    a non-monitoring mode to charge and discharge the capacitor to inject voltage into a high-voltage (HV) power transmission line to modify power grid characteristics;
    a local bypass monitoring mode to bypass the capacitor, with upper switches of the H-bridge enabled and lower switches of the H-bridge disabled, or the lower switches of the H-bridge enabled and the upper switches of the H-bridge disabled; and
    a low-loss monitoring mode to discharge the capacitor, with all the four switches of the H-bridge enabled.

2. The FACTS device of claim 1, with the plurality of modes further comprising:
  a diagnostic mode to monitor current across each of the four switches of the H-bridge, with deviation of current across a switch to indicate a potential issue.

3. The FACTS device of claim 1, further comprising:
  a signal conditioning module coupled to the current transformer to extract a current and filter the extracted current.

4. The FACTS device of claim 1, further comprising:
  a phase calculator coupled to the state machine, the phase calculator to calculate phase of voltage to be injected in the non-monitoring mode.

5. The FACTS device of claim 1, further comprising:
  a gate driver coupled to the state machine, the gate driver to drive the four switches of the H-bridge.

6. The FACTS device of claim 1, further comprising:
  the non-monitoring mode includes operating with the H-bridge in a half-bridge mode to charge the capacitor.

7. The FACTS device of claim 1, further comprising:
  the non-monitoring mode to filter noise from a current extracted from the current transformer, calculate phase of voltage to be injected by the H-bridge, generate control signals and drive the four switches of the H-bridge.

8. A system to protect a Flexible AC Transmission Systems (FACTS) device in a high-voltage (HV) power transmission line, comprising:
  a capacitor;
  a first switch and a second switch, each having a first terminal connected to a first terminal of the capacitor;
  a third switch and a fourth switch, each having a first terminal connected to a second terminal of the capacitor;
  a second terminal of the first switch and a second terminal of the second switch connectable to a first terminal of an alternating current (AC) current source;
  a current transformer (CT) having a first terminal connectable to a second terminal of the AC current source and a second terminal connected to a second terminal of the third switch and a second terminal of the fourth switch; and
  a state machine to operate the first, second, third and fourth switches as an H-bridge when so connected to the AC current source and the current transformer, in a plurality of modes comprising:

a non-monitoring mode to charge and discharge the capacitor to inject voltage into the HV power transmission line to modify power grid characteristics;
a local bypass monitoring mode to bypass the capacitor, with the first and third switches enabled and the second and fourth switches disabled, or the second and fourth switches enabled and the first and third switches disabled;
a low-loss monitoring mode to discharge the capacitor, with the first, second, third and fourth switches enabled; and
a diagnostic mode to monitor current across each of the first, second, third and fourth switches, with deviation of current across a switch indicating a potential issue.

9. The system of claim 8, further comprising:
a signal conditioning module coupled to the current transformer to extract a current and filter out noise from the extracted current, for use in determining phase of voltage to be injected by the first, second, third and fourth switches in the non-monitoring mode.

10. The system of claim 8, further comprising:
a phase calculator coupled to the state machine, the phase calculator to calculate phase of voltage to be injected by the first, second, third and fourth switches in the non-monitoring mode.

11. The system of claim 8, further comprising:
a gate driver coupled to the state machine and the first, second, third and fourth switches, the gate driver to drive the first, second, third and fourth switches.

12. The system of claim 8, further comprising:
the non-monitoring mode includes charging the capacitor with the first and fourth switches enabled and the second and third switches disabled, or the second and third switches enabled and the first and fourth switches disabled.

13. The system of claim 8, further comprising:
the non-monitoring mode to filter noise from a current extracted from the current transformer, calculate phase of voltage to be injected by the first, second, third and fourth switches, generate control signals and drive the first, second, third and fourth switches.

14. A method of protecting a Flexible AC Transmission Systems (FACTS) device, performed by the FACTS device, the method comprising:
operating four switches of an H-bridge of the FACTS device in a non-monitoring mode, with top and bottom of the H-bridge connected across a capacitor of the FACTS device and middle of the H-bridge connected to a primary side of a current transformer and across a series connection of the current transformer and an alternating current (AC) current source, to charge the capacitor of the FACTS device from the AC current source and discharge the capacitor to inject voltage into a high-voltage (HV) power transmission line to modify power grid characteristics; and
responsive to a determination to discharge the capacitor, operating the four switches of the H-bridge in a low-loss monitoring mode with all four switches of the H-bridge enabled.

15. The method of claim 14, further comprising:
responsive to a fault, operating the four switches of the H-bridge in a local bypass monitoring mode to bypass the capacitor, with upper switches of the H-bridge enabled on lower switches of the H-bridge disabled, or the lower switches of the H-bridge enabled and the upper switches of the H-bridge disabled.

16. The method of claim 14, further comprising:
monitoring current across each of the four switches of the H-bridge in a diagnostic mode; and
responsive to a deviation of current across one or more of the four switches of the H-bridge, indicating a potential issue.

17. The method of claim 14, further comprising:
extracting a current from a secondary side of the current transformer through a signal conditioning module coupled to the secondary side of the current transformer;
filtering the extracted current, to remove noise; and
calculating phase of voltage to be injected by the four switches of the H-bridge, based on the extracted, filtered current.

18. The method of claim 14, further comprising:
driving the four switches of the H-bridge by a gate driver that is coupled to a state machine and coupled to the four switches of the H-bridge.

19. The method of claim 14, further comprising:
in the non-monitoring mode, charging the capacitor by operating the four switches of the H-bridge in a half-bridge mode.

* * * * *